United States Patent
Cheng et al.

(10) Patent No.: US 9,338,673 B2
(45) Date of Patent: May 10, 2016

(54) DEVICE AND METHOD OF ENHANCING DOWNLINK UE-SPECIFIC DEMODULATION REFERENCE SIGNAL TO FACILITATE INTER-CELL INTERFERENCE CANCELLATION AND SUPPRESSION

(71) Applicant: Futurewei Technologies Inc., Plano, TX (US)

(72) Inventors: Qian Cheng, Aurora, IL (US); Weimin Xiao, Hoffman Estates, IL (US); Jialing Liu, Palatine, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 49 days.

(21) Appl. No.: 14/489,284

(22) Filed: Sep. 17, 2014

(65) Prior Publication Data

US 2015/0078190 A1   Mar. 19, 2015

Related U.S. Application Data

(60) Provisional application No. 61/878,737, filed on Sep. 17, 2013.

(51) Int. Cl.
*G01R 31/08* (2006.01)
*H04W 24/02* (2009.01)
*H04L 1/00* (2006.01)
*H04L 27/00* (2006.01)
*H04J 11/00* (2006.01)
*H04L 5/00* (2006.01)
*H04L 27/26* (2006.01)

(52) U.S. Cl.
CPC .............. *H04W 24/02* (2013.01); *H04J 11/005* (2013.01); *H04J 11/0056* (2013.01); *H04J 11/0093* (2013.01); *H04L 1/00* (2013.01); *H04L 27/00* (2013.01); *H04L 5/001* (2013.01); *H04L 5/0051* (2013.01); *H04L 27/2613* (2013.01)

(58) Field of Classification Search
CPC .......... H04W 24/02; H04L 1/00; H04L 27/00; H04L 5/001; H04L 5/0051; H04L 27/2613; H04J 11/005; H04J 11/0093; H04J 11/0056
See application file for complete search history.

(56) References Cited

U.S. PATENT DOCUMENTS

| | | | | |
|---|---|---|---|---|
| 2013/0142062 A1* | 6/2013 | Dinan | .................... | H04W 24/00 370/252 |
| 2013/0155897 A1* | 6/2013 | Ihm | ........................ | H04B 7/024 370/252 |
| 2013/0155981 A1* | 6/2013 | Kitazoe | .................... | H04W 8/26 370/329 |
| 2013/0203398 A1* | 8/2013 | Callard | ................. | H04W 88/08 455/418 |
| 2013/0301543 A1* | 11/2013 | Eriksson | ............... | H04W 72/00 370/329 |
| 2014/0269246 A1* | 9/2014 | Yoo | ........................... | H04J 3/10 370/201 |
| 2014/0301301 A1* | 10/2014 | Cheng | .................... | H04L 5/0048 370/329 |
| 2015/0071100 A1* | 3/2015 | Yang | .................... | H04L 27/2666 370/252 |
| 2015/0078190 A1* | 3/2015 | Cheng | .................... | H04W 24/02 370/252 |
| 2015/0124732 A1* | 5/2015 | Seo | ........................ | H04L 5/0048 370/329 |
| 2015/0181572 A1* | 6/2015 | Guo | ........................ | H04L 5/0048 370/312 |

* cited by examiner

*Primary Examiner* — Robert Wilson
(74) *Attorney, Agent, or Firm* — Futurewei Technologies, Inc.

(57) ABSTRACT

Various devices and methods are provided that use enhanced downlink demodulation reference signals (DMRS) to facilitate inter-cell interference cancellation and suppression. Coordinated configuration of DMRS port assignments for transmission from cells in a group of neighboring cells is provided. Each cell's physical cell identification (PCID) is mapped with its corresponding assigned antenna port(s).

20 Claims, 7 Drawing Sheets

DEVICE AND METHOD OF ENHANCING DOWNLINK UE-SPECIFIC DEMODULATION REFERENCE SIGNAL TO FACILITATE INTER-CELL INTERFERENCE CANCELLATION AND SUPPRESSION

CROSS-REFERENCE TO RELATED APPLICATION

This application claims priority under 35 USC 119(e) to U.S. provisional Application Ser. No. 61/878,737, filed on Sep. 17, 2013, and which is incorporated herein by reference.

TECHNICAL FIELD

The present disclosure relates generally to communications systems, and more particularly to enhancing downlink UE-specific demodulation reference signals to facilitate inter-cell interference cancellation and suppression.

BACKGROUND

The amount of wireless data being transferred is expected to exceed that of wired data, pushing the limits of macro cell deployment. Small cell deployment may be used to help handle this increase in data capacity, while meeting customer quality of service expectations and operators' requirements for cost-effective service delivery.

Small cells generally are low-power wireless access points that operate in a licensed spectrum. Small cells provide improved cellular coverage, capacity and applications for homes and businesses, as well as metropolitan and rural public spaces. Different types of small cells include, generally from smallest size to largest size, femto cells, pico cells, metro cells and micro cells.

With the introduction of small cells into the homogeneous wireless network, the cell density in the network increases significantly which results in higher interference signal levels from neighboring cells. The strong inter-cell interference has a severe negative impact on user equipment (UE) achievable data throughput, especially for UEs at the cell edge.

Advanced receiver algorithms can be employed at the UE baseband to improve its performance by canceling and suppressing inter-cell interference. These advanced receiver algorithms are typically non-linear in nature and require some knowledge of the interfering signal and network coordination.

SUMMARY

In a first embodiment, there is provided a method for cancelling interference received at a user equipment (UE). The method includes receiving a first signal from a serving base station transmitted on a first antenna port, the first signal including a first demodulation reference signal (DRMS), and receiving an interfering signal from a neighboring base station transmitted on a second antenna port, the interfering signal including a second DMRS coded orthogonally different from the first signal. The method further includes determining a cell identification of the neighboring base station and identifying the second antenna port based on a predefined mapping between a plurality of cell identifications and antenna ports, recovering DMRS information of the interfering signal from the second DMRS using the identified second antenna port, and performing interference cancellation on the first signal and the second signal using the recovered DMRS information of the interfering signal.

In a second embodiment, there is provided a method for interference cancellation at a user equipment. The method includes obtaining information mapping each physical cell identification (PCID) of each base station in a group of neighboring base stations with one or more antenna ports assigned to the respective base station; receiving a desired signal from a serving base station; receiving an interfering signal from a neighboring base station; identifying a PCID of the neighboring base station; determining from the identified PCID the one or more antenna ports associated with the neighboring base station; recovering demodulation reference signal (DMRS) information carried in the interfering signal based on the determined one or more antenna ports; and performing interference cancellation on the desired signal and the interfering signal using the recovered DMRS information of the interfering signal.

In yet another embodiment, there is provided a method for facilitating inter-cell interference in a wireless communications network. The method includes assigning a set of antenna ports to each of a first base station and a plurality of coordinating neighboring base stations for transmission of user equipment-specific reference signals (UE-RS) according to the assigned antenna ports, each assigned antenna port different from each other; assigning a common DMRS scrambling identity to the first base station and the plurality of coordinating neighboring base stations; generating an association between the respective assigned set of antenna ports and the first base station and plurality of coordinating neighboring base stations; and transmitting the association and the common scrambling identity to at least one UE within the coordinating base stations for use in an inter-cell interference process.

In another embodiment, there is provided a method for facilitating inter-cell interference in a wireless communications network. The method includes assigning, according to a default association, a set of ports to each of a first base station and a plurality of coordinating neighboring base stations for transmission of user equipment-specific reference signals (UE-RS) according to the assigned antenna ports, each assigned antenna port different from each other; transmitting the UE-RS according to the assigned set of ports from the first base station to at least one user equipment (UE) located within a region served by the first base station; and transmitting the UE-RS according to the assigned port from at least one of the plurality of neighboring base stations.

BRIEF DESCRIPTION OF THE DRAWINGS

For a more complete understanding of the present disclosure, reference is now made to the following description, taken in conjunction with the accompanying drawing, in which.

DETAILED DESCRIPTION

Figure 1:
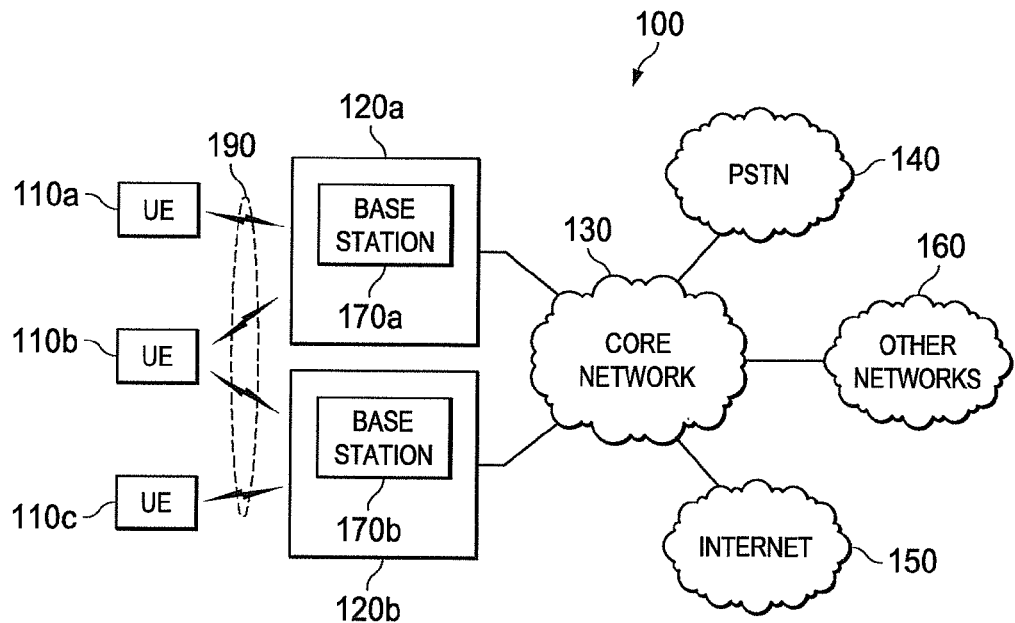
FIG. 1 illustrates an example communication system that enhances downlink demodulation reference signals to facilitate inter-cell interference cancellation and suppression in accordance with disclosed embodiments.

FIG. 1 illustrates an example communication system 100 that enhances downlink demodulation reference signals to facilitate inter-cell interference cancellation and suppression according to this disclosure. In general, the system 100 enables multiple wireless users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes user equipment (UE) 110a-110c, radio access networks (RANs) 120a-120b, a core network 130, a public switched telephone network (PSTN) 140, the Internet 150, and other networks 160. While certain numbers of these components or elements are shown in FIG. 1, any number of these components or elements may be included in the system 100.

The UEs 110a-110c are configured to operate and/or communicate in the system 100. For example, the UEs 110a-110c are configured to transmit and/or receive wireless signals. Each UE 110a-110c represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 120a-120b here include base stations 170a-170b, respectively. Each base station 170a-170b is configured to wirelessly interface with one or more of the UEs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the UEs 110a-110c over one or more air interfaces 190 using wireless communication links. The air interfaces 190 may utilize any suitable radio access technology.

It is contemplated that the system 100 may use multiple channel access functionality, including such schemes as described above. In particular embodiments, the base stations and UEs implement LTE, LTE-A, and/or LTE-B. Of course, other multiple access schemes and wireless protocols may be utilized.

The RANs 120a-120b are in communication with the core network 130 to provide the UEs 110a-110c with voice, data, application, Voice over Internet Protocol (VoIP), or other services. Understandably, the RNs 120a-120b and/or the core network 130 may be in direct or indirect communication with one or more other RNs (not shown). The core network 130 may also serve as a gateway access for other networks (such as PSTN 140, Internet 150, and other networks 160). In addition, some or all of the UEs 110a-110c may include functionality for communicating with different wireless networks over different wireless links using different wireless technologies and/or protocols.

As described above, advanced receivers using Interference Rejection Combining (IRC) methods and techniques can be effective at combating interference. However, if the signal constellation of an interfering signal (called an "interferer") is known, other types of receivers such as successive interference cancellation receivers may actually achieve better performance than IRC receivers. Constellations are used with digital modulation schemes, such as quadrature amplitude modulation (QAM) or phase shift keying (PSK). A transmitted symbol is represented as a complex number, and cosine and sine carrier signals are modulated with the real and imaginary parts of the complex number. The symbol can then be sent with two carriers on the same frequency.

In accordance with this disclosure, the base stations 170a-170b (or other devices) provide enhanced downlink demodulation reference (DMRS) signals to facilitate inter-cell interference cancellation and suppression to support advanced receivers in the UEs 110a-110c (or other devices). In an exemplary embodiment, the enhanced downlink DMRS signals are orthogonally coded. Without this signaling, the advanced receivers may have no information about the source(s) of interference, so little can be done to reduce or eliminate this interference other than assume that the interference is additive Gaussian white noise (AGWN). However, with the information from the signaling, advanced receivers are able to more effectively identify the source(s) of interference and reduce or eliminate that interference. With the information contained in the signaling, for example, the advanced receivers can achieve good performance, such as near maximum likelihood (ML) receiver performance. The advanced receivers are therefore able to more effectively reduce or eliminate interference in their incoming signals. Additional details regarding this functionality are provided below.

Although FIG. 1 illustrates one example of a communication system 100 that enhances downlink demodulation reference signals to facilitate inter-cell interference cancellation and suppression to support advanced wireless receivers, various changes may be made to FIG. 1. For example, the communication system 100 could include any number of UEs, base stations, networks, or other components in any suitable configuration. Also, the signaling and the advanced receivers that use this signaling can be used in any other suitable system.

Figure 2A:
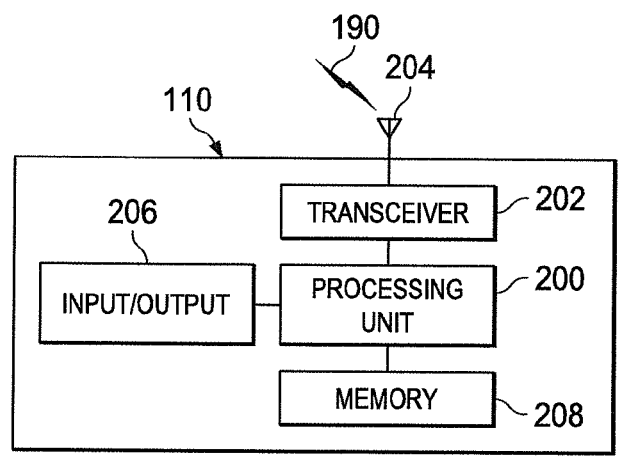
FIGS. 2A and 2B illustrate example devices that use enhanced downlink demodulation reference signals to facilitate inter-cell interference cancellation and suppression in accordance with disclosed embodiments.
Figure 2B:
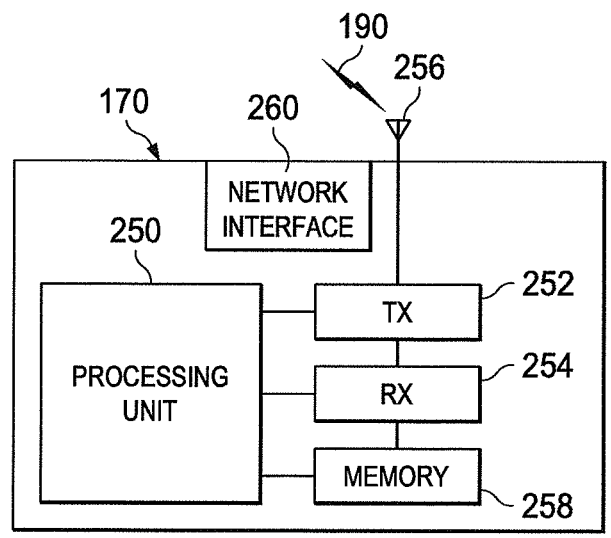

FIGS. 2A and 2B illustrate example devices that use enhanced downlink demodulation reference signals to facilitate inter-cell interference cancellation and suppression to support advanced wireless receivers according to this disclosure. In particular, FIG. 2A illustrates an example UE 110, and FIG. 2B illustrates an example base station 170. These components could be used in the system 100 or in any other suitable system.

As shown in FIG. 2A, the UE 110 includes at least one processing unit 200. The processing unit 200 implements various processing operations of the UE 110. For example, the processing unit 200 could perform signal coding, data processing, power control, input/output processing, or any other functionality enabling the UE 110 to operate in the system 100. The processing unit 200 also supports the receipt and use of enhanced downlink demodulation reference signals to facilitate inter-cell interference cancellation and suppression as described in more detail below. Each processing unit 200 includes any suitable processing or computing device configured to perform one or more operations. Each processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna 204. The transceiver 202 is also configured to demodulate data or other content received by the at least one antenna 204. Each transceiver 202 includes any suitable structure for generating signals for wireless transmission and/or processing signals received wirelessly. Each antenna 204 includes any suitable structure for transmitting and/or receiving wireless signals. One or multiple transceivers 202 could be used in the UE 110, and one or multiple antennas 204 could be used in the UE 110. Although shown as a single functional unit, a transceiver 202 could also be implemented using at least one transmitter and at least one separate receiver.

The UE 110 further includes one or more input/output devices 206. The input/output devices 206 facilitate interaction with a user. Each input/output device 206 includes any suitable structure for providing information to or receiving information from a user, such as a speaker, microphone, keypad, keyboard, display, or touch screen.

In addition, the UE 110 includes at least one memory 208. The memory 208 stores instructions and data used, generated, or collected by the UE 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and a network interface 260. The processing unit 250 implements various processing operations of the base station 170, such as signal coding, data processing, power control, input/output processing, or any other functionality. The processing unit 250 can also support the generation of signaling as described in more detail below. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless transmission to one or more UEs or other devices. Each receiver 254 includes any suitable structure for processing signals received wirelessly from one or more UEs or other devices. Although shown as separate components, at least one transmitter 252 and at least one receiver 254 could be combined into a transceiver. Each antenna 256 includes any suitable structure for transmitting and/or receiving wireless signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s).

Additional details regarding UEs 110 and base stations 170 are known to those of skill in the art. As such, these details are omitted here for clarity.

Although FIGS. 2A and 2B illustrate examples of such devices, various changes may be made to FIGS. 2A and 2B. For example, each device 200, 250 could include any other or additional components according to particular needs. Also, the signaling can be generated by any other suitable device or system, and the advanced receiver can be used in any other suitable device or system.

Figure 3:
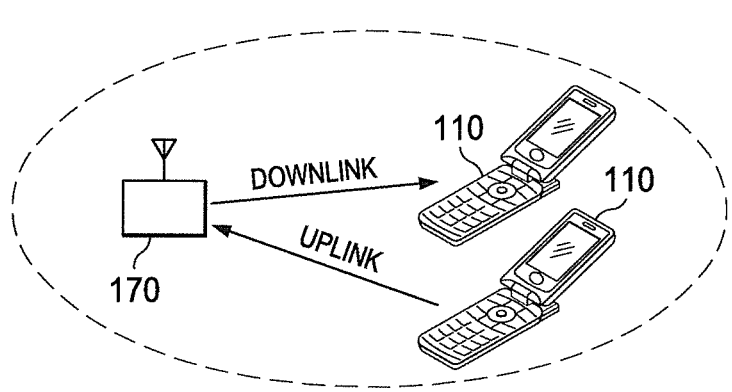
FIG. 3 illustrates downlink and uplink transmission in accordance with disclosed embodiments.

In modern wireless communications systems, such as a Third Generation Partnership Project (3GPP) Long Term Evolution (LTE) compliant communications system, a plurality of cells or evolved NodeBs (eNB) (also commonly referred to as NodeBs, base stations (BSs), base terminal stations, communications controllers, network controllers, controllers, access points (APs), and so on) may be arranged into a cluster of cells, with each cell having multiple transmit antennas. Additionally, each cell or eNB may be serving a number of users (also commonly referred to as User Equipment (UE), mobile stations, users, subscribers, terminals, and so forth) based on a priority metric, such as fairness, proportional fairness, round robin, and the like, over a period of time. It is noted that the terms cell, transmission points, and eNB may be used interchangeably. Distinction between cells, transmission points, and eNBs will be made where needed). As shown in FIG. 3, the transmission/reception from the base station 170 to the UE 110 is called downlink (DL) transmission/reception, and the transmission/reception from the UE 110 to the base station 170 is called uplink (UL) transmission/reception.

In orthogonal frequency-division multiplexing (OFDM) systems, a frequency bandwidth is divided into multiple subcarriers in a frequency domain. In a time domain, one subframe is divided into multiple OFDM symbols. The OFDM symbol may have a cyclic prefix to avoid or reduce inter-symbol interference due to multiple path delays. One resource element (RE) is defined by the time-frequency resource within one subcarrier and one OFDM symbol. A reference signal and other signals, such as a data channel, e.g., physical downlink shared channel (PDSCH), and control channel, e.g., physical downlink control channel (PDCCH), are orthogonal and multiplexed in different resource elements in a time-frequency domain. Further, the signals are modulated and mapped into resource elements. By using an inverse Fourier transform per each OFDM symbol, signals in the frequency domain are transformed into signals in the time domain, and are transmitted with added cyclic prefix to avoid the inter-symbol interference.

Figure 4:
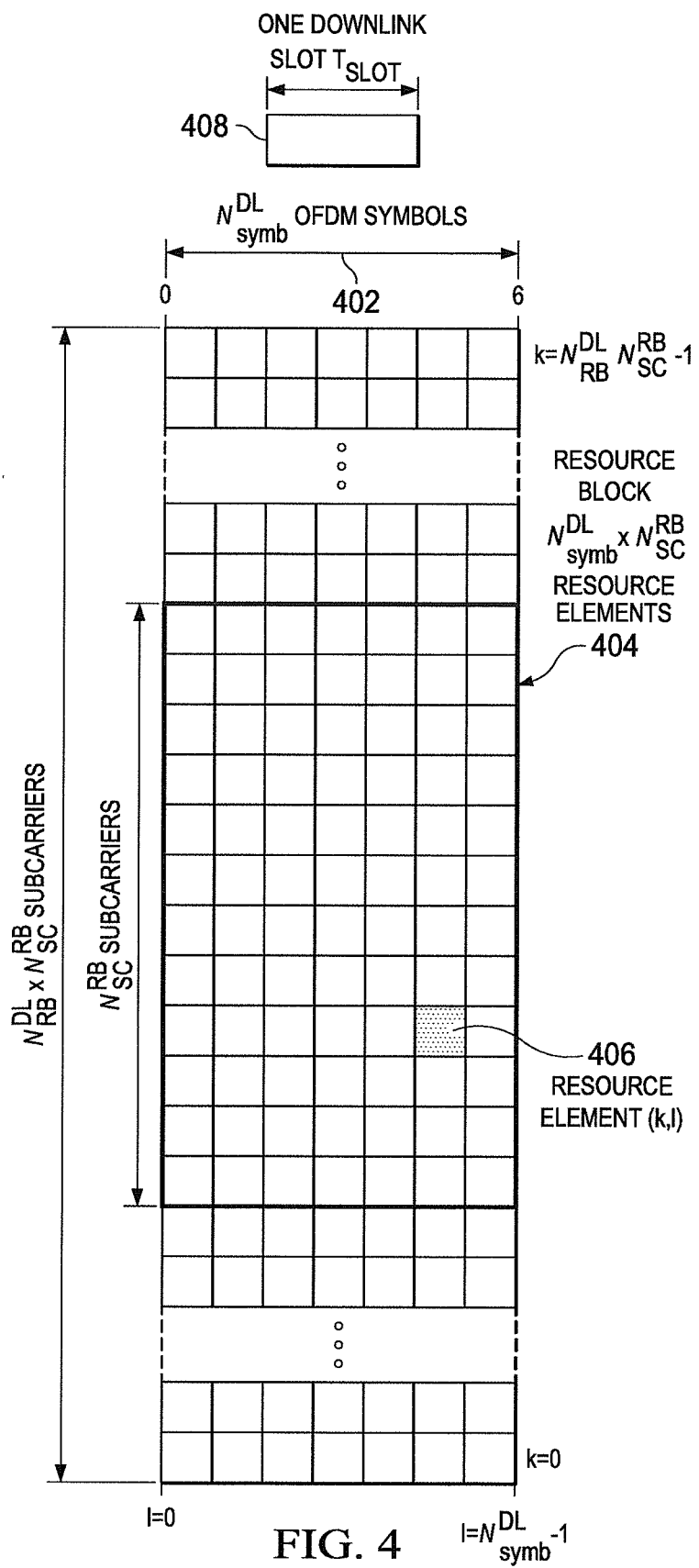
FIG. 4 illustrates example OFDM symbols with normal cyclic prefix (CP) in accordance with disclosed embodiments.

FIG. 4 illustrates example OFDM symbols 402 with normal cyclic prefix (CP). Each resource block (RB) 404 contains a number of REs 406. In an exemplary embodiment, there are 14 OFDM symbols labeled from 0 to 13 in each sub-frame. For ease of illustration, only 7 OFDM symbols (e.g., symbols labeled 0 to 6) are shown. The symbols 0 to 6 in each sub-frame may correspond to even slots, and the symbols 7 to 13 in each sub-frame may correspond to odd slots. As illustrated, only one downlink slot 408 of a sub-frame is shown. In the illustrated embodiment there are 12 subcarriers in each RB, and in this example, there are 168 REs in an RB. In each sub-frame, there are a number of RBs, and the number of RBs may depend on the bandwidth (BW).

Figure 5:
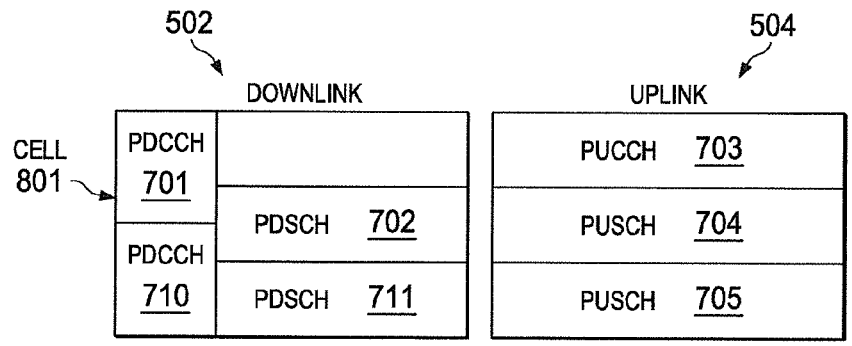
FIG. 5 illustrates an example of physical data and control channels in accordance with disclosed embodiments.

As shown in FIG. 5, the data channels transmitting data packets from an eNB to one or more UEs in the physical layer are referred to as a physical downlink shared channel (PD-SCH) 502, and the data channels transmitting data packets from one or more UEs to an eNB in the physical layer are referred to as a physical uplink shared channel (PUSCH) 504. The corresponding physical control channels transmitted from the eNB to the UEs indicate where the corresponding PDSCH and/or PUSCH is in the frequency domain and in which manner the PDSCH and/or PUSCH is transmitted. The corresponding physical control channels are referred to as a physical downlink control channel (PDCCH). As illustrated in FIG. 5, PDCCH 701 may indicate the signaling for PDSCH 702 or PUSCH 704.

According to the 3GPP Technical Specifications Group Radio Access Network, Requirements for Further Advancement for E-UTRA (LTE-Advanced or LTE), Release-11, an enhanced PDCCH (EPDCCH) is a downlink control channel having similar functionality as the PDCCH, but the transmission of the EPDCCH may be in the data region of a Release-8 system, and the EPDCCH demodulation is based on the DMRS as opposed to CRS-based demodulation for the PDCCH.

Figure 6:
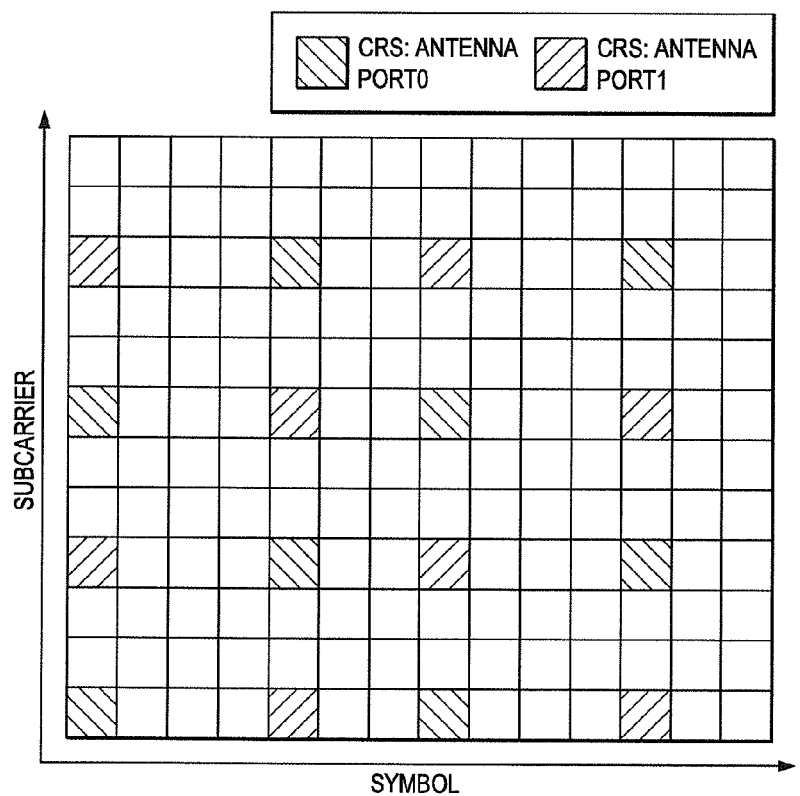
FIG. 6 illustrates an example of common reference signal (CRS) in accordance with disclosed embodiments.

In a downlink transmission in an LTE-A system, there is a reference signal for the UE to perform channel estimation for demodulation of the physical downlink control channel (PD-CCH) and other common channels, as well as for measurement and some feedback. The reference signal is referred to as a common/cell-specific reference signal (CRS) inherited from the Release-8/9 specification of E-UTRA, as shown in FIG. 6.

The UE-specific demodulation reference signals (DMRS) are transmitted by the UE in the physical uplink shared channel (PUSCH) in Release-8 and Release-9. Release-10 includes the added functionality of having DMRS in the physical downlink shared channel (PDSCH). In the downlink, DMRS is used for channel estimation during the PDSCH demodulation (DMRS can also be transmitted together with the EPDCCH for the channel estimation of the EPDCCH by the UE).

Figure 7:
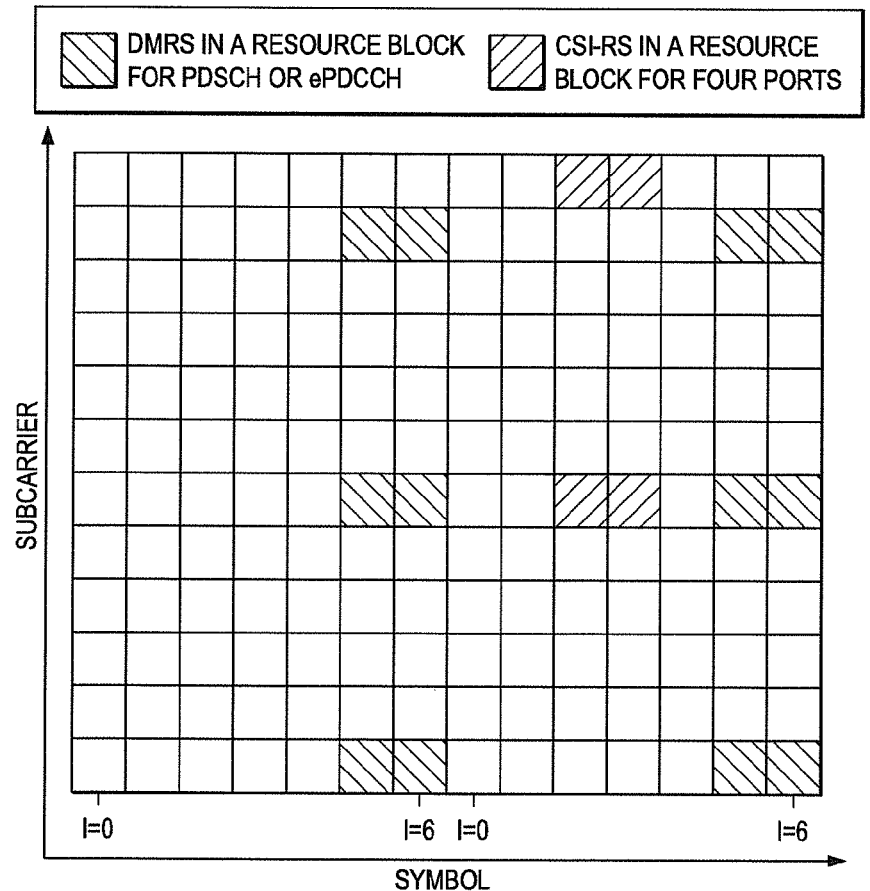
FIG. 7 illustrates an example of CSI-RS and DMRS in accordance with disclosed embodiments.

In Release-10, a channel status indicator reference signal (CSI-RS) was also introduced in addition to the CRS signal and DMRS, as shown in FIG. 7. The CSI-RS is used by UEs in Release-10 to measure the channel status, especially for multiple antennas cases. In addition, other feedback information may be based on the measurement of CSI-RS, such as a precoding matrix indicator (PMI), a channel quality indicator (CQI), and a rank indicator (RI) of the precoding matrix. There may be multiple CSI-RS resources configured for a UE. There is a specific time-frequency resource and scrambling code assigned by the eNB for each CSI-RS resource.

Reference signals (e.g., CRS, CSI-RS or DMRS) are used by a receiver to estimate the channel impulse response and/or channel power delay profile (PDP). The RS may be a pseudorandom sequence QPSK modulated on the subcarriers assigned for the RS transmission. Upon receiving the RS, the receiver performs demodulation and descrambling by multiplying the conjugate of the pseudorandom sequence. The resulting signal is then transformed into the time domain by an inverse fast Fourier transform (IFFT) operation to obtain the channel PDP estimation. Further measurements may be performed based on the obtained PDP estimates.

Figure 8:
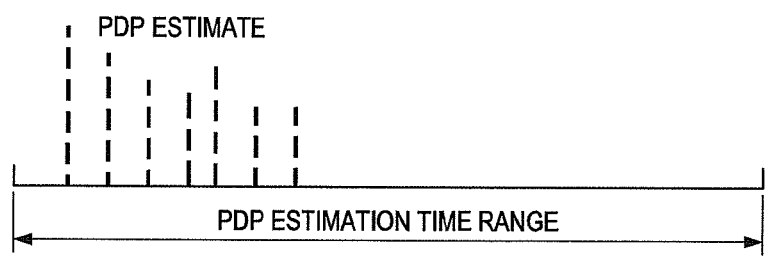
FIG. 8 illustrates an example of channel PDP estimates in accordance with disclosed embodiments.

FIG. 8 illustrates an example of a channel PDP estimate obtained from the above mentioned processing of the RS. For different tone spacings (i.e., subcarrier spacings), the illustrated PDP estimation time range may take different values. For example, if the RS occupies contiguous tones in an OFDM symbol, the time range is equal to the symbol duration. If the RS uniformly occupies one tone out of every 6 tones in an OFDM symbol, the time range is equal to one sixth of the symbol duration.

The RSs from different transmitters may be assigned to different sets of subcarriers and are separated in the frequency domain, and may also be assigned to different pseudorandom sequences and separated via low correlation between the pseudorandom sequences. However, the RSs from different transmitters may also be assigned to transmit on the same set of subcarriers and use the same pseudorandom sequence. In these cases, the RSs can strongly interfere with each other. In current LTE systems, the use of the same pseudorandom sequence in RSs for different cells on the same set of time/frequency resources is typically done only if the cells are far apart from each other so that the RS interference may be reduced to an allowable range. This is typically considered at the network planning stage.

The transmission of DMRS involves the modulation on a scrambling sequence which is generated by:

$$r(m) = \frac{1}{\sqrt{2}}(1 - 2 \cdot c(2m)) + j\frac{1}{\sqrt{2}}(1 - 2 \cdot c(2m+1)),$$

$$m = \begin{cases} 0, 1, \ldots, 12 N_{RB}^{max,DL} - 1 & \text{normal cyclic prefix} \\ 0, 1, \ldots, 16 N_{RB}^{max,DL} - 1 & \text{extended cyclic prefix} \end{cases}$$

The pseudo-random sequence c(i) is defined in Section 7.2 of 3GPP 36.211. The pseudo-random sequence generator is initialized with:

$$c_{init} = (\lfloor n_s/2 \rfloor + 1) \cdot (2n_{ID}^{(nSCID)} + 1) \cdot 2^{16} + n_{SCID}$$

at the start of each sub-frame. The quantities $n_{ID}^{(i)}$, i=0,1, are given by:
- $n_{ID}^{(i)} = n_{ID}^{cell}$ if no value for $n_{ID}^{DMRS,i}$ is provided by higher layers or if DCI format 1A, 2B or 2C is used for the DCI associated with the PDSCH transmission
- $n_{ID}^{(i)} = n_{ID}^{DMRS,i}$ otherwise The value of $n_{SCID}$ is zero unless specified otherwise. For a DMRS downlink transmission on ports 7 or 8, $n_{SCID}$ is given by the DCI format 2B, 2C or 2D of 3GPP 36.212 associated with the PDSCH transmission.

Figure 9:
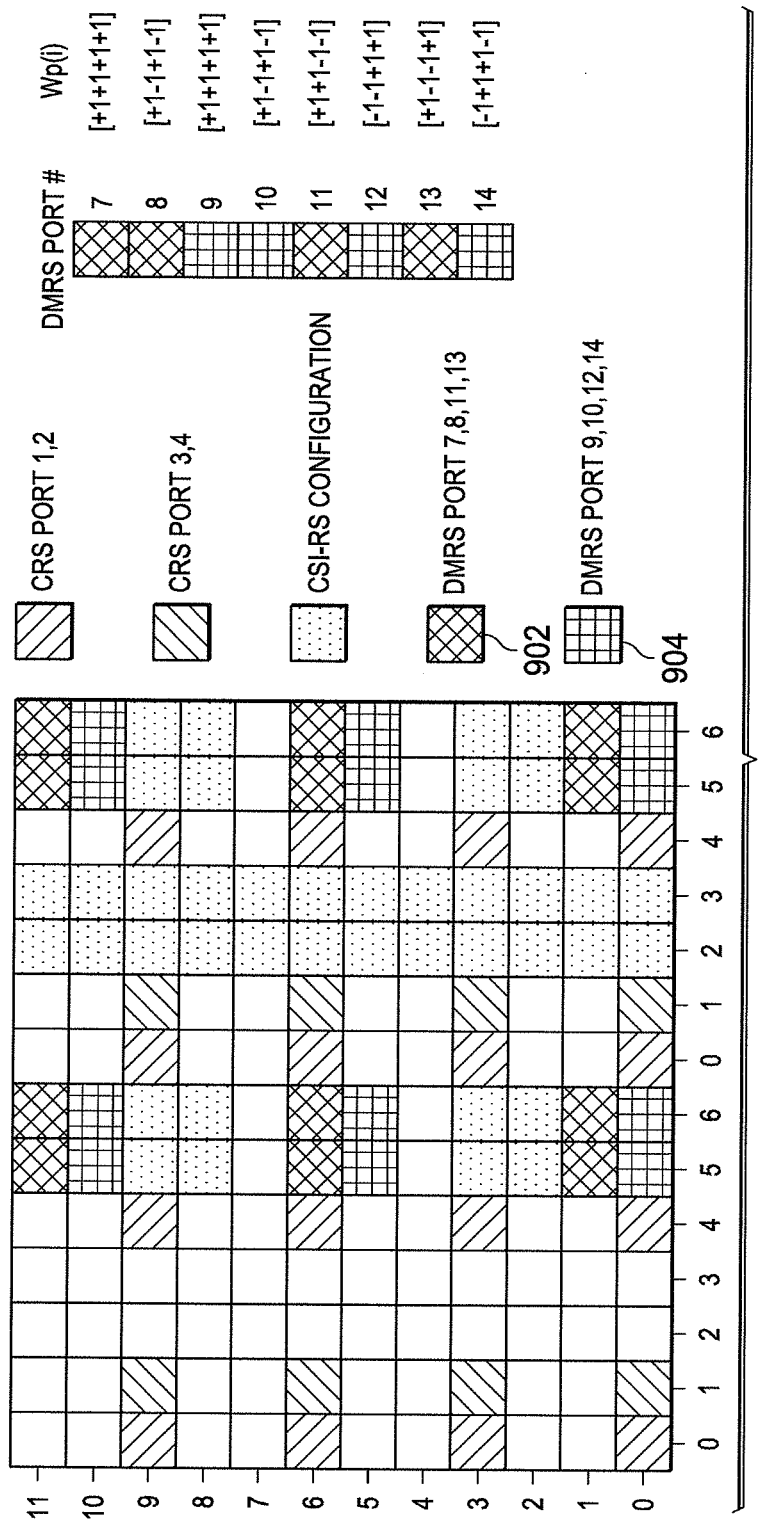
FIG. 9 illustrates the DMRS port configuration in accordance with disclosed embodiments.

As illustrated in FIG. 9, there are a maximum of eight (8) orthogonal DMRS antenna ports for the transmission of DMRS signals. The 8 DMRS ports are divided into two groups. A first group 902 includes DMRS antenna ports 7, 8, 11 and 13, and a second group 904 includes DMRS antenna ports 9, 10, 12 and 14. The DMRS signals are transmitted on two sets of resource elements (RE). The four (4) antenna ports within the same group are multiplexed together by orthogonal code. One drawback is that DMRS resource elements from different cells may collide. Another drawback is that between cells, there is no coordination on DMRS port assignments. In addition, a given UE is not aware of a neighboring cell's DMRS port and PDSCH configurations.

A heterogeneous network (HetNet) may include a macro cell and a pico cell, or generally a higher power node/antenna with a larger coverage and lower power node/antennas with a smaller coverage. Lower power nodes (or lower power points, picos, femtos, micros, relay nodes, remote radio heads, remote radio units, distributed antennas, etc.) generally are low-power wireless access points that operate in a licensed spectrum. Lower power nodes provide improved cellular coverage, capacity and applications for homes and businesses, as well as metropolitan and rural public spaces.

In the 3GPP Release-10 specification, a component carrier is referred to as a "cell". When multiple cells are controlled by the same eNB, it is possible to implement cross scheduling of multiple cells because there may be a single scheduler in the same eNB to schedule the multiple cells. With carrier aggregation (CA), one eNB may operate and control several component carriers forming a Primary Cell (Pcell) and a Secondary Cell (Scell). For purposes of reference, the term Primary Cell (PCell) includes the cell operating in the primary frequency (component carrier) in which the UE either performs the initial connection establishment procedure or initiates the connection re-establishment procedure, or the cell indicated as the primary cell in a handover procedure. The term Secondary Cell (SCell) includes the cell operating on a secondary frequency (component carrier) which may be configured once a PCell with the UE is established and which may be used to provide additional radio resources.

In Release-11, an eNB may control both a macro cell and a pico cell. In this case, the backhaul between the macro cell and the pico cell is a fast backhaul. The eNB can control the transmission/reception of both the macro cell and the pico cell dynamically. The PDCCH or EPDCCH transmitted from the macro cells (or points) can be used to indicate the PDSCH or PUSCH transmitted from the pico cell (or points).

The eNBs may be arranged in close proximity to each other such that a decision made by a first eNB may have an impact on a second eNB. For example, the eNBs may use their transmit antenna arrays to form beams towards their UEs when serving their UEs. This may mean that if the first eNB decides to serve a first UE in a particular time-frequency resource, it may form a beam pointing to that UE. However, the pointed beam may extend into a coverage area of the second eNB and cause interference to UEs served by the second eNB. The inter-cell interference (ICI) for small cell wireless communications systems is commonly referred to as an interference limited cell scenario, which may be different from a noise limited cell scenario seen in large cell wireless communications systems.

In Release-12 or in future releases, the backhaul between the macro cell and the pico cell may not be a fast backhaul. In other words, the backhaul may be a slow backhaul, or any backhaul. In a slow backhaul scenario, generally the PDCCH or EPDCCH transmitted from the macro cells (or points) cannot be used to indicate the PDSCH or PUSCH transmitted from the pico cell (or points).

In a realistic Network, there may be multiple macro points and multiple pico points operating in multiple component carriers, and the backhaul between any two points can be fast backhaul or slow backhaul depending on the deployment. When two points have fast backhaul, the fast backhaul may be fully utilized, e.g., to simplify the communication method and system or to improve coordination. In a realistic network, the points configured for a UE for transmission or reception may include multiple points, some pairs of points may have fast backhaul, but some other pairs of points may have slow backhaul or any backhaul.

In a realistic deployment, an eNB may control one or more cells. Multiple remote radio units may be connected to the same base band unit of the eNB by fiber cable, and the latency between the base band unit and the remote radio unit is quite small. Therefore the same base band unit can process the coordinated transmission/reception of multiple cells. For example, the eNB may coordinate the transmissions of multiple cells to a UE, which is called coordinated multiple point (CoMP) transmission. The eNB may also coordinate the reception of multiple cells from a UE, which is called CoMP reception. In this case, the backhaul link between these cells with the same eNB is fast backhaul and the scheduling of PDSCH transmitted in different cells for the UE can be easily coordinated in the same eNB.

As an extension of the HetNet deployment, densely deployed small cells using low power nodes are considered promising to cope with the mobile traffic explosion, especially for hotspot deployments in indoor and outdoor scenarios. A low-power node generally refers to a node whose transmission power is lower than a macro node and BS classes. Lower power nodes such as pico and femto eNBs are non-limiting illustrative examples. Small cell enhancements for E-UTRA and E-UTRAN, which is an ongoing study in 3GPP, will focus on additional functionalities for enhanced performance in hotspot areas for both indoor and outdoor use using densely deployed low power nodes.

A UE typically discovers the surrounding small cells by firstly identifying the cell through detecting the downlink Primary Synchronization Signal (PSS)/Secondary Synchronization Signal (SSS). Secondly, the UE performs a signal power measurement based upon the downlink CRS of these identified cells from the first step. If the measured signal power is above a certain threshold, the cell discovery is considered successful. For mobility and other network operation optimization purposes, the UE may be required to monitor several cells. To increase the chance that the UE is able to discover weaker cells under one or two dominant strong interfering cells, an interference cancellation (IC) technique may be used in which the dominant strong interfering cells are first discovered and then their PSS/SSS/CRS are reconstructed and subtracted from the UE received signal. Weaker cell discovery is then performed upon the remaining signal.

In dense small cell scenarios, there could be several strong interferers of similar strength. Under this interference condition, there is little benefit of interference cancellation due to the lack of a small number of dominant interferers. In another small cell deployment scenario, efficient small cell operation may require the introduction of techniques for interference management where some small cells may be silent at certain times. With the reduced interference, it may be possible to maintain or even improve the network throughput performance with reduced network resources, in cases such as where the traffic load is light or medium. If the traffic load increases, on the other hand, the network may activate some inactive small cells to support the increased traffic load. For example, transmission of common signals can be avoided in certain sub-frames without negative impact to the UE measurements. On the other hand if such solutions include cells that stop transmitting for a long time, the discovery of these cells would become even more challenging.

Figure 10:
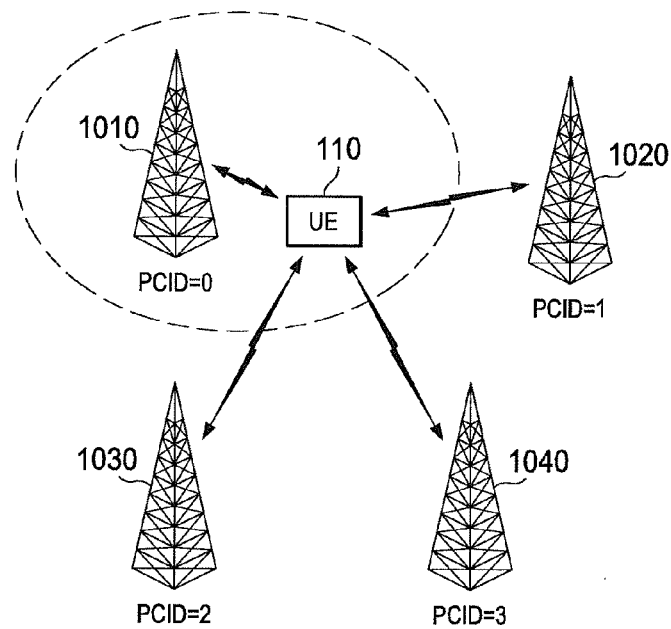
FIG. 10 illustrates the inter-cell interference scenario.

FIG. 10 illustrates an inter-cell interference scenario in which the UE A 110 receives not only the PDSCH transmission from cell A 1010 having PCID=0, but also some strong PDSCH interference from cell B 1020 having PCID=1, some strong PDSCH interference from cell C 1030 having PCID=2, and some strong PDSCH interference from cell D 1040 having PCID=3. In the inter-cell interference scenario, UE demodulation performance at the cell edge of the serving cell is limited by the interference imposed by the neighboring cells.

How effective the UE is at mitigating the inter-cell interference determines the UE achievable throughput. Many prior art advanced receiver algorithms are designed to cope with the interference and improve the cell edge spectrum efficiency and can generally be divided into three categories. Each receiver type may operate under various degrees of knowledge of interferer parameters.

1. Interference Suppression (IS) Receivers
   IS receivers apply linear filtering to the received signal to suppress the interference, as opposed to explicitly cancelling the interference. Interference parameters that can enable interferer channel estimation are needed, including, e.g., the interferer's DMRS or CRS with PMI/RI.
2. Maximum Likelihood (ML) Receivers
   ML receivers perform joint detection of useful and interference signals in accordance with the ML criterion. Interference parameters that can enable interferer channel estimation and interferer detection at a symbol level (e.g., modulation type) are needed.
3. Interference Cancellation (IC) Receivers
   IC receivers utilize successive application of linear detection, reconstruction, and cancellation on interference. Interference parameters that can enable interferer channel estimation and interferer detection at a symbol level (e.g., modulation type) are needed.

The performance of these advanced receivers significantly depends on the channel estimation qualities of interference signals. Poor quality of channel estimation may result in complete loss of performance gain of advanced receivers over conventional linear receivers. DMRS collision degrades channel estimation performance. Non-linear advanced receivers, e.g., ML and IC receivers, require knowledge of the interference signal, e.g., the modulation type (QPSK, 16QAM and 64QAM).

The UE may obtain this required information to perform interference cancellation through full blind-detection or full network signaling or somewhere in-between. The drawback of full blind-detection is its reliability at low interference to signal ratio scenarios. An erroneous detection decision on interfering signal modulation type will have error propagation effect on serving cell PDSCH demodulation and decoding. Full network signaling will accurately inform the UE about the modulation type employed at the interfering cell transmitters but at the cost of increased signaling overhead, increased restriction on PSDCH scheduling, and increased backhaul requirements.

The present disclosure, in one exemplary embodiment, provides coordinated configuration of DMRS transmission from cells in a group of neighboring cells. In this embodiment, a DMRS configuration set for the neighboring cells is determined, and it includes information describing the mapping between DMRS antenna ports and associated cell identities (e.g., Physical Cell ID) and rate matching configurations. The rate matching configuration may define the way the UE needs to perform rate matching around the DMRS antenna ports for PDSCH transmission.

Because prior art systems do not include coordination of DMRS port assignments, in most scenarios, neighboring cells will usually transmit on antenna ports 7 and/or 8 for layer 1/2 transmissions within their own cell. In addition, the UE is unaware of neighboring cells' DMRS port and PDSCH configurations. This leads to different DMRS resource elements from neighboring cells colliding. In other words, the PDSCH received at the UE from its serving cell and the PDSCH received at the UE from an interfering neighbor cell can include different DMRS signals within the same DMRS resource element—thus causing DMRS interference. While the DMRS resource elements from the two cells are not perfectly aligned, there will be substantial overlap causing interference. Thus, it may be difficult or impossible for the UE to determine the DMRS of the interfering neighbor cell. Without this information, the UE may be unable to demodulate the interfering PDSCH in order to cancel the interference it causes in the desired PDSCH.

DMRS collisions cause degradation in the channel estimation performance of the UE both in its own channel and in the interfering channel. Because channel estimation significantly affects the quality of inter-cell interference cancellation/suppression, it is desirable to reduce or eliminate the negative effects of DMRS collisions. In addition, when a UE is at a cell edge, the DMRS interference is greater due to the low SINR. Under these conditions, adequate inter-cell interference cancellation/suppression is difficult to achieve.

To perform good inter-cell interference cancellation/suppression (i.e., symbol level interference cancellation or maximum likelihood detection), knowledge about the interfering signal(s) is required. In most cases, this information includes resource block (RB) allocation, modulation type and DMRS scrambling sequence/code.

In general terms, neighboring cells (base stations) are configured (assigned) to transmit on specific antenna ports having differently coded DMRS. As will be appreciated, the system owner/administrator of the wireless system will perform the configuration (which is performed at system/base station startup and/or can be performed dynamically at various times). This can be done system-wide or based on discrete groupings.

Once configured/assigned, DMRS antenna configuration information is generated and stored within the network, and in one embodiment may be stored at each base station (or each base station may store a subset of the information—for itself and its neighboring cells). This information maps each cell's PCID with its corresponding assigned antenna port(s). In addition, each of the cells within the coordinating set use the scrambling sequence determined by $n_{ID}^{DMRS,i}$ signaled to UE. The DMRS antenna configuration may also include the $n_{ID}^{DMRS,i}$ information used by the cells within a coordinating set and/or transmitted as a part of high-layer signaling to the UE. Alternatively, the $n_{ID}^{DMRS,i}$ information may be transmitted separately from the antenna configuration information.

During operation, the network may transmit the DMRS antenna configuration information to the UE. This may be implemented through high-layer signaling, such as transmission within the PDSCH of the serving cell. In another embodiment, there may be a default association between the PCIDs and the corresponding antenna ports (e.g., AP indexing) eliminating the need for transmission to the UE.

During operation, the network may transmit rate matching information to the UE. This may be implemented through high-layer signaling in a semi-static way or through downlink control indicator (DCI) signaling in a dynamic way.

In addition to the DMRS antenna port configuration information (or alternative use of a default association), the UE obtains the DMRS scrambling sequence(s) utilized by the cells. As will be appreciated, the serving and neighboring cells DMRS scrambling sequences are obtained from high-layer signaling as described above.

When a UE detects a relatively strong interfering signal from an interfering neighbor cell, its PCID is determined from the detection of the PSS/SSS. Based on the PCID, the UE determines from the DMRS antenna port configuration information about the specific antenna port on which the interfering neighbor cell is transmitting. From this, the UE knows which resource element(s) within the interfering cell's PDSCH transmission contains its DMRS.

Based on the received rate matching information transmitted by the network, the UE performs rate matching for PDSCH around reserved resource elements for DMRS transmission. In addition, based on the received rate matching information, the UE determines the range of DMRS ports and resource elements to search for neighboring cell DMRS transmissions.

Table 1 below provides an illustrative example. A group of four neighboring cells having physical cell IDs of PCID=0, 1, 2 and 3, respectively. Antenna ports 7-14 (as defined in Release 10 and later) transmit the DMRS with specified coding (see FIG. 9). Two possible DMRS antenna configuration sets are shown below involving these 4 cells:

TABLE 1

| PCID | 0 | 1 | 2 | 3 |
|---|---|---|---|---|
| DMRS transmission antenna port for one-layer PDSCH | 7 | 8 | 11 | 13 |
| DMRS transmission antenna ports for two-layer PDSCH | 7, 9 | 8, 10 | 11, 12 | 13, 14 |
| Rate matching options: 0-around scheduled DMRS ports 1: around DMRS ports assume two layer PDSCH | 0 | 0 | 0 | 0 |

If transmitting in only one layer (rate matching=0), each cell may be assigned to transmit on a single specified antenna port—as illustrated in the Table 1 above. Based on this phenomenon, the present disclosure provides a system and method that assigns neighboring cells to transmit on specific antenna ports. In the example shown above, the assignment of antenna ports 7, 8, 11 and 13 to respective cells 0, 1, 2 and 3 results in the transmission of DMRS signals that are coded orthogonally. The DMRS signals transmitted from cells 0, 1, 2 and 3 are received at the UE with little or no interference because they are covered by orthogonal codes. This results in greatly improved DMRS channel estimation despite the overlapping DMRS resource elements of antenna ports 7,8,11 and 13.

If transmitting in two layers (rate matching=1), each cell may be assigned to transmit on two specified antenna ports—as illustrated in the Table 1 above. In the example shown above, the assignment of antenna ports 7/9, 8/10, 11/12 and 13/14 to respective cells 0, 1, 2 and 3 similarly results in the transmission of DMRS signals that are coded orthogonally, resulting in reception at the UE with little or no interference.

As will be appreciated, regardless of the actual number of layers of PDSCH transmission from each cell within the coordinating set of cells, the UE received DMRS signals will be orthogonal to each other through code multiplexing and PDSCH interference free through PDSCH muting on all the possible DMRS ports.

The mapping between the DMRS antenna ports and the cell identity may not necessarily be the absolute antenna port number. It could be an offset related to a certain reference DMRS antenna port, e.g., DMRS antenna port 7. It will be appreciated that various other DMRS antenna port and cell identity associations are also possible other than the mappings described in the above examples as long as the basic goal of orthogonal and PDSCH interference free DMRS can be achieved. As another example, the DMRS configuration may only define the mapping involving three coordinating cells and six DMRS antenna ports, leaving two DMRS antenna ports (e.g., ports 7 and 8) for MU-MIMO operation within the cell.

As described above, the signaling of the DMRS antenna configuration information to the UE may be sent in the PDSCH of the serving cell. In another embodiment, it could be transmitted in the form of cell broadcasting or the cell sending UE specific radio resource control (RRC) signaling.

In the other embodiment briefly described above, no DMRS antenna configuration is signaled. The network may utilize a default association between DMRS ports and PCIDs—some specific assignment or numbering for the DMRS configuration. One example may be to utilize indexing, such as 9+2*((PCID)mod(3))+k, k=0, 1. Another example is to associate the cell PCID to the DMRS antenna port allocation as shown in the following Table 2:

TABLE 2

| | PCID | | |
|---|---|---|---|
| | (PCID mod 3) = 0 | (PCID mod 3) = 1 | (PCID mod 3) = 2 |
| DMRS transmission antenna port for one-layer PDSCH | 8 | 11 | 13 |
| DMRS transmission antenna ports for two-layer PDSCH | 8, 10 | 11, 12 | 13, 14 |
| Rate matching options: 0-around scheduled DMRS ports 1: around DMRS ports assume two layer PDSCH | 1 | 1 | 1 |

DMRS antenna ports 7 and 9 could be used for legacy transmission, e.g., MU-MIMO within one cell.

Independent of the above orthogonal DMRS antenna port configuration, separately it is desirable for the UE to know the type of modulation used by the interfering cell to generate its PDSCH transmission. This may be transmitted to the UE in any manner. In one embodiment, the modulation type is encoded or included with the scrambling sequence parameter(s)—as described in more detail below.

Conventional transmission of DMRS involves the modulation on a scrambling sequence (see above). In an exemplary embodiment, the DMRS scrambling sequence is modified for a particular DMRS port and initialized by the parameters which are associated with the PDSCH modulation type and/or cell identity (e.g., PCID). The scrambling sequence may have the modulation type and/or PCID encoded or included within the scrambling sequence. In this manner, the UE can obtain modulation type information from the scrambling sequence instead of receiving this information by a separate transmission. An example to illustrate the association is given by:

$$c_{init} = (\lfloor n_s/2 \rfloor + 1) \cdot (2n_{ID}^{(nSCID)} + 1) \cdot 2^{16} + n_{SCID}$$

TABLE 3

| Modulation type | QPSK | 16 QAM | 64 QAM |
|---|---|---|---|
| $n_{ID}^{(nSCID)}$ | | $N_{ID}^{cell}$ (PCID) | |
| $n_{SCID}$ | 0 | 1 | 2 |

Another example is to initialize the same scrambling sequence for the 16 QAM and 64 QAM modulation types and a different scrambling sequence for the QPSK modulation type:

TABLE 4

| Modulation type | QPSK | 16 QAM | 64 QAM |
|---|---|---|---|
| $n_{ID}^{(nSCID)}$ | | $N_{ID}^{cell}$ (PCID) | |
| $n_{SCID}$ | 0 | 1 | 1 |

Figure 11:
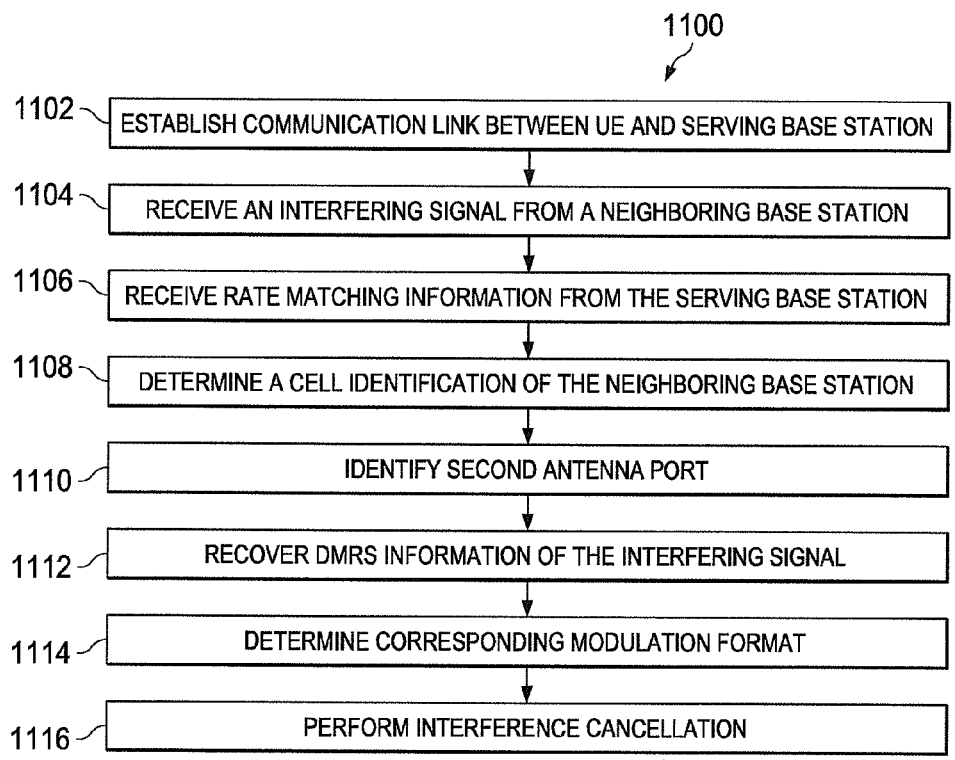
FIG. 11 illustrates an example method that uses enhanced downlink demodulation reference signals to facilitate inter-cell interference cancellation and suppression in accordance with disclosed embodiments.

FIG. 11 illustrates an example method 1100 that uses enhanced downlink demodulation reference signals to facilitate inter-cell interference cancellation and suppression in accordance with disclosed embodiments. In some embodiments, the method 1100 could be performed by a UE 110 to support more effective reduction of interference.

A communication link is established between a UE and a serving base station at step 1102. This could include, for example, the UE 110 of FIG. 10 receiving a first signal from a serving base station (i.e., the base station 1010) transmitted on a first antenna port. The first signal includes a first demodulation reference signal (DMRS).

An interfering signal is received from a neighboring base station at step 1104. For example, an interfering signal transmitted on a second antenna port may be received from a neighboring base station (e.g., one of the cells 1020, 1030, and 1040). The interfering signal comprises a second DMRS coded orthogonally different from the first signal.

Rate matching information is received at step 1106. For example, the rate matching information is received by the UE from the serving base station.

The UE monitors one or more of the strongest detectable interfering signals and determines a cell identification of the neighboring base station at step 1108. For example, for each interfering signal from an interfering neighbor cell with measurement results above a certain threshold, its PCID is determined. For example, the cells 1020 and 1030 may have interfering signals that satisfy the threshold, and their corresponding PCIDs (e.g., PCID=1 and PCID=2, respectively) may be determined.

The second antenna port is identified at step 1110. For example, the second antenna port may be identified based on a predefined mapping between a plurality of cell identifications and antenna ports and the received rate matching information. The predefined mapping may be obtained based on information mapping each PCID of each base station in a group of neighboring base stations with one or more antenna ports assigned to the respective base station. Based on the received rate matching information transmitted by the network, the UE performs rate matching for PDSCH around reserved resource elements for DMRS transmission and determines the range of DMRS ports and resource elements to search for neighboring cell DMRS transmissions.

DMRS information of the interfering signal is recovered from the second DMRS using the identified second antenna port at step 1112. For example, based on the PCID, the UE determines from the DMRS antenna configuration information the specific antenna port on which the interfering neighbor cell is transmitting. From this, the UE knows which resource element(s) within the interfering cell's PDSCH transmission contains its DMRS, and the DMRS information may be recovered.

Separately, a corresponding modulation format may be determined at step 1114. For example, once the UE obtains the DMRS information, the UE may perform DMRS sequence detection on the interfering signal to determine its modulation type.

The UE performs interference cancellation at step 1116. For example, interference cancellation may be performed on the first signal and the second signal using the recovered DMRS information of the interfering signal. In addition, the DMRS sequence detection results may be input to an inter-cell interference cancellation process/method, such as a symbol level interference cancellation or maximum likelihood detection process, enabling the UE to perform good interference cancellation/suppression.

Although FIG. 11 illustrate an example of a method 1100 that uses enhanced downlink demodulation reference signals to facilitate inter-cell interference cancellation and suppression, various changes may be made to FIG. 11. For example, while shown as a series of steps, various steps could overlap, occur in parallel, occur in a different order, or occur multiple times. Also, while described as being performed by a UE 110, the method 1100 could be performed by any other device in a wireless communication system.

Although the above descriptions are mainly for LTE systems, the concepts may be applicable in other systems such as HSPA systems, WiFi systems, etc.

The following references are related to subject matter of the present application. Each of these references is incorporated herein by reference in its entirety:

3GPP LTE-RAN1 7.1.6.

Although features and elements are described above in particular combinations, each feature or element can be used alone without the other features and elements or in various combinations with or without other features and elements. Some or all of the functions or processes of the one or more of the devices or methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for cancelling interference received at a user equipment (UE), the method comprising:

receiving a first signal from a serving base station transmitted on a first antenna port, the first signal comprising a first demodulation reference signal (DRMS);
receiving an interfering signal from a neighboring base station transmitted on a second antenna port, the interfering signal comprising a second DMRS coded orthogonally different from the first signal;
determining a cell identification of the neighboring base station;
identifying the second antenna port in accordance with a predefined mapping between a plurality of cell identifications and antenna ports;
recovering DMRS information of the interfering signal from the second DMRS using the identified second antenna port; and
performing interference cancellation on the first signal and the second signal using the recovered DMRS information of the interfering signal.

2. The method in accordance with claim 1, wherein determining the cell identification comprises identifying the neighboring base station through detecting a downlink synchronization signal.

3. The method in accordance with claim 1, wherein signaling the rate matching information through semi-static high-layer signaling or through dynamic DCI signaling.

4. The method in accordance with claim 2, wherein determining the cell identification further comprises:
measuring signal power of the interfering signal of the identified cell; and
determining the cell identification in response to the measured signal power satisfying a threshold value.

5. The method in accordance with claim 1, wherein the predefined mapping is in accordance with information mapping each physical cell identification (PCID) of each base station in a group of neighboring base stations with one or more antenna ports assigned to the respective base station.

6. The method in accordance with claim 5, wherein the predefined mapping is received via a transmission within a physical downlink shared channel (PDSCH) of the serving base station.

7. The method in accordance with claim 5, wherein the predefined mapping is determined according to a default association between the PCID of each base station and a respective one or more antenna ports.

8. The method in accordance with claim 1, further comprising:
receiving rate matching information from the serving base station; and
recovering the DMRS information of the interfering signal from the second DMRS using the identified second antenna port and the received rate matching information.

9. A method for interference cancellation at a user equipment (UE), the method comprising:
obtaining information mapping each physical cell identification (PCID) of each base station in a group of neighboring base stations with one or more antenna ports assigned to the respective base station;
receiving a desired signal from a serving base station;
receiving an interfering signal from a neighboring base station;
identifying a PCID of the neighboring base station;
determining from the identified PCID the one or more antenna ports associated with the neighboring base station;
based at least in part on the determined one or more antenna ports, recovering demodulation reference signal (DMRS) information carried in the interfering signal; and
performing interference cancellation on the desired signal and the interfering signal using the recovered DMRS information of the interfering signal.

10. The method in accordance with claim 9, wherein the information mapping each PCID with one or more antenna ports is obtained via a transmission within a physical downlink shared channel (PDSCH) of the serving base station.

11. The method in accordance with claim 9, wherein the information mapping each PCID with one or more antenna ports is obtained in accordance with a default association between the PCID of each base station and a respective one or more antenna ports.

12. The method in accordance with claim 9, further comprising:
receiving rate matching information from the serving base station; and
recovering the demodulation reference signal (DMRS) information carried in the interfering signal based at least in part on the determined one or more antenna ports and the received rate matching information.

13. A method for facilitating inter-cell interference in a wireless communications network, the method comprising:
assigning a set of antenna ports to each of a first base station and a plurality of coordinating neighboring base stations for transmission of user equipment-specific reference signals (UE-RS) according to the assigned antenna ports, each assigned antenna port different from each other;
assigning a common DMRS scrambling identity to the first base station and the plurality of coordinating neighboring base stations;
generating an association between the respective assigned set of antenna ports and the first base station and plurality of coordinating neighboring base stations; and
transmitting the association and the common scrambling identity to at least one UE within the coordinating base stations for use in an inter-cell interference process.

14. The method in accordance with claim 13 wherein the association maps physical cell identifications of the first base station and the plurality of coordinating neighboring base stations with the assigned antenna ports.

15. The method in accordance with claim 14 wherein the UE-RS comprises a demodulation reference signal (DMRS).

16. The method in accordance with claim 13 further comprising:
transmitting the association and common scrambling identity to the at least one UE from the first base station.

17. The method in accordance with claim 13 wherein a set of assigned antenna ports comprises at least two.

18. A method for facilitating inter-cell interference in a wireless communications network, the method comprising:
assigning, according to a default association, a set of ports to each of a first base station and a plurality of coordinating neighboring base stations for transmission of user equipment-specific reference signals (UE-RS) according to the assigned antenna ports, each assigned antenna port different from each other;
transmitting the UE-RS according to the assigned set of ports from the first base station to at least one user equipment (UE) located within a region served by the first base station; and transmitting the UE-RS according to the assigned port from at least one of the plurality of neighboring base stations.

19. The method in accordance with claim 18 wherein the UE-RS comprises a demodulation reference signal (DMRS).

20. The method in accordance with claim 18, further comprising:
   transmitting rate matching information from the first base station to the UE indicating which set of ports the UE is to use to perform rate matching.

* * * * *